July 8, 1952     J. M. MARKEL     2,602,389
PLOW

Filed Oct. 14, 1948     2 SHEETS—SHEET 1

Inventor:
John M. Markel
By: Soans, Pond & Anderson
Attys.

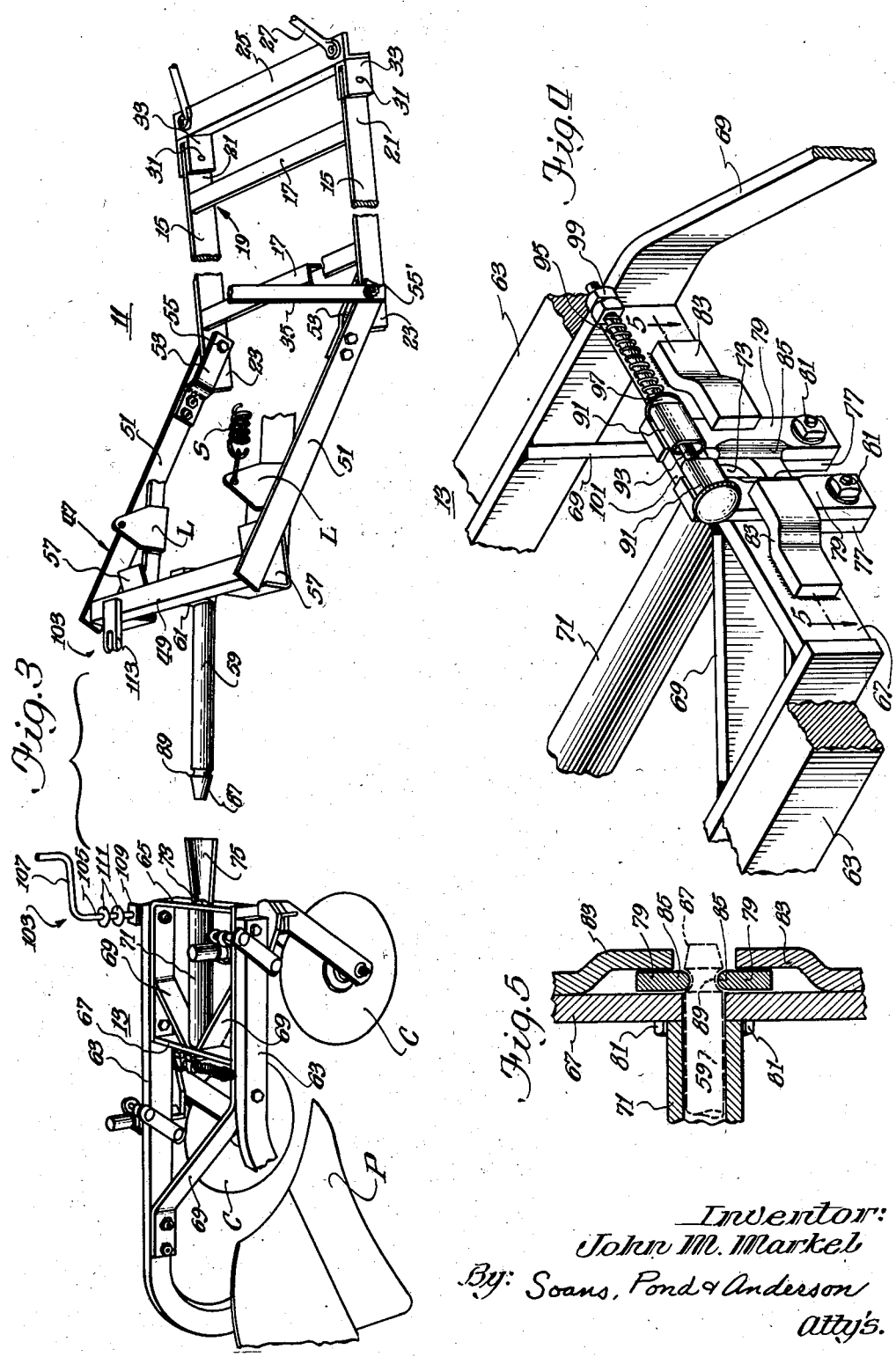

Patented July 8, 1952

2,602,389

UNITED STATES PATENT OFFICE 2,602,389

PLOW

John M. Markel, Rockford, Ill., assignor to J. I. Case Company, Racine, Wis., a corporation of Wisconsin Application October 14, 1948, Serial No. 54,423

8 Claims. (Cl. 97—47)

The present invention relates to an improved plow construction, and in particular relates to an improved construction for tractor mounted plows.

There are numerous advantages in the use of tractor supported plows. The tractor provides a relatively inexpensive means of transporting and controlling the action of the plow bottoms, and in addition, it provides a relatively stable support for the plows with resultant improved plowing action. Further, since the plow bottoms of a tractor mounted plow structure are supported closely adjacent to the rearward end of the tractor, it is possible to till soil which is adjacent to fences and other obstructions.

However, despite the advantages of tractor supported plows, various difficulties have been encountered in supporting and controlling the plow bottoms, and these difficulties have tended to restrict the use of such plows. When the plow bottoms of a tractor mounted plow strike an obstruction in the field during operation, the plow tends to dig under the obstruction and this action tends to raise the forward end of the tractor. Under these conditions it is extremely difficult to break the plows free from the obstruction, and in some instances the shock incident to hitting the obstruction or the stresses resulting from freeing the plow, may warp or twist the plow supporting frame sufficiently to necessitate extensive repairs.

Because of the above difficulties, the prior art tractor mounted plows were usually provided with a heavy, rigid supporting frame which was difficult to mount on and to dismount from the associated tractor. Further, because of the massive construction, adequate provision could not be made for conveniently adjusting the angular position of the plow bottoms relative to the vertical, transversely of the line of draft of the tractor. If the plows are to operate most efficiently, angular adjustment of this character should be made by the operator, during operation, for various types and conditions of soil.

The principal object of the present invention is the provision of a tractor mounted plow of generally improved construction. A more specific object of the invention is the provision of a plow structure which will be light in weight, which will be readily adaptable to all working conditions, and which may be easily attached to and detached from the associated tractor. Other objects of the invention will become known by reference to the following description and the accompanying drawings of one embodiment thereof.

In the drawings:

Fig. 3 is a fragmentary, perspective view which shows the plow structure detached from the tractor;

Fig. 4 is an enlarged fragmentary view of a releasable locking means which forms a part of the apparatus illustrated in the preceding drawings; and Fig. 5 is a sectional view taken on line 5—5 in Fig. 4.

Figure 1:
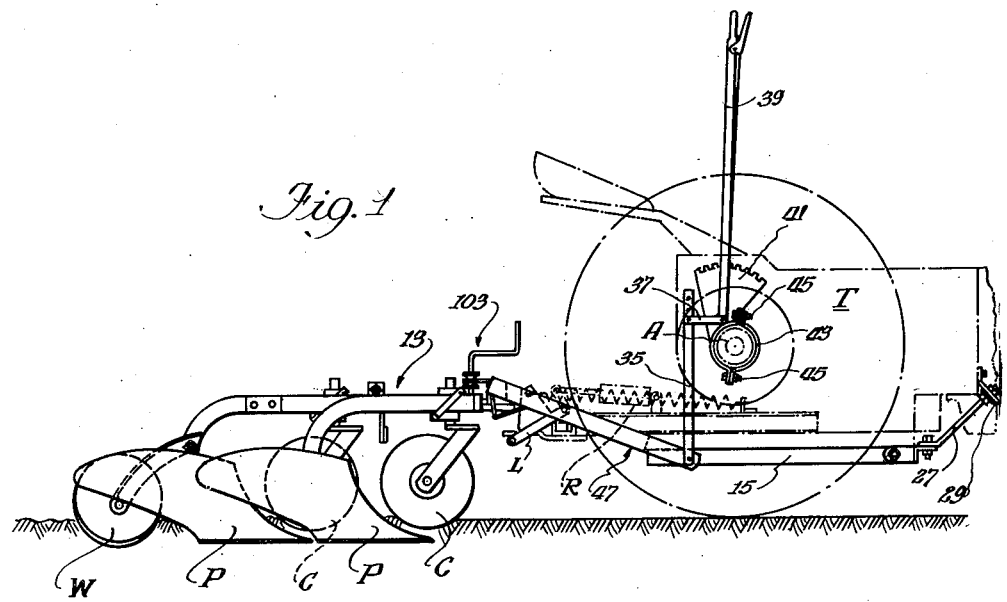
Fig. 1 is a side elevational view of a plow embodying various features of the invention. The plow as illustrated is mounted on a tractor, the plow bottoms being in lowered or plowing position.

In general, a plow in accordance with the invention includes a frame 11 adapted to be adjustably supported on the tractor T which is to be associated with the plow. The frame 11 is adapted to be releasably inter-engaged with a sub-frame 13 which carries the usual plow bottoms P and coulters C. Means are also provided intermediate the frame 11 and the sub-frame 13 for adjusting the angular position of the plow bottoms P relative to the vertical, transversely of the line of draft of the tractor T.

In the embodiment of the invention illustrated, the frame 11 is of fabricated construction and includes longitudinally and transversely extending structural members 15 and 17, respectively, which form a frame section 19 of rectangular shape. The longitudinal members 15 of the section 19 extend beyond the transverse members 17 to provide a pair of spaced apart, projecting arms 21 and 23 at the forward and rearward ends, respectively, of the rectangular section 19. The rectangular section 19 is hingedly attached by means of the projecting arms 21 at its forward end to a transversely extending, connecting or angle member 25 which is attached to the underside of the associated tractor T adjacent the rear axle housing. Each of the ends of the connecting member 25 are braced by a pair of members or rods 27 which extend forwardly to a bracket 29 on the chassis of the tractor T.

Figure 2:
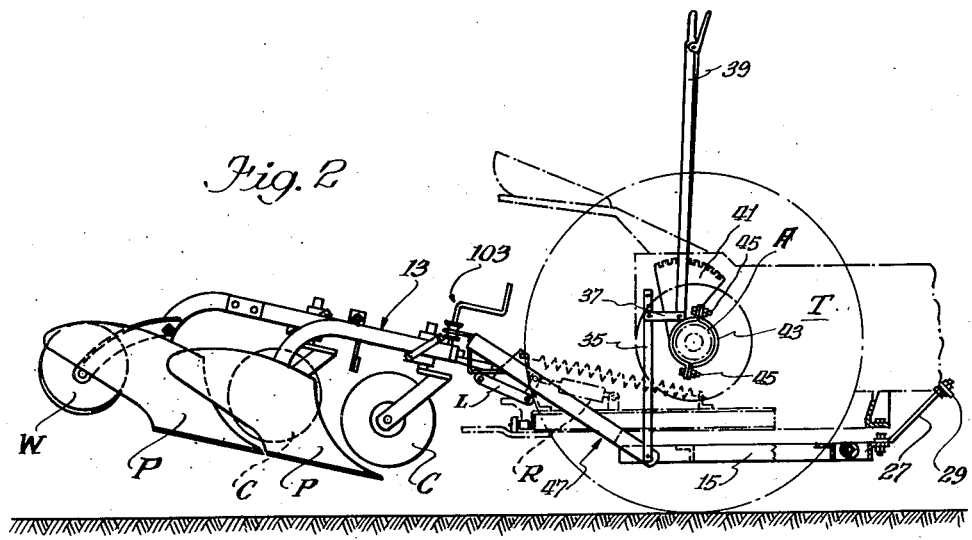
Fig. 2 is a view similar to Fig. 1 showing the plow in the raised or transport position.

The hinged connection between the rectangular section 19 and the connecting member 25 includes a pair of co-axial, transversely extending, horizontally disposed pivots 31 which engage each of the arms 21 of the rectangular section 19 with a clevis 33 attached to the connecting member 25 (Figs. 1, 2, and 3). The rearward end of the rectangular-shaped frame section 19 is adjustably connected to the tractor T by a vertically extending supporting link 35, the upper end of which is pivotally attached to a crank arm 37 actuated by a control lever 39 on the tractor T. Movement of the control lever 39 thereby effects vertical adjustment of the rearward end of the rectangular frame section 19. A conventional quadrant and latch arrangement 41 is provided on the tractor T for releasably locking the control lever 39 in any one of a number of positions. In order to provide for the ready detachment of the frame 11 from the tractor T, the crank arm 37, the control lever 39, and the quadrant and latching arrangement, in the illustrated embodiment, are supported upon a two-piece ring 43 which is adapted to be clamped around the rear axle A of the tractor T by suitable bolts 45 or the like.

The frame 11 also includes a bail-like draft section 47 (Fig. 3) which is pivotally attached for vertical movement to the rearwardly extending arms 23 of the rectangular-shaped frame section 19. The bail-like section 47 includes a horizontally disposed, transversely extending cross bar 49 which has a forwarly extending connecting arm 51 attached to each of its ends. An offset bracket is attached to the forward end of each of the connecting arms 51 to provide a fork 53 which is adapted to embrace one of the rearwardly extending arms 23 of the rectangular frame section 19. Each of the forks 53 is attached to one of the rearwardly extending arms 23 by a transversely extending, horizontally disposed pivot pin 55. As illustrated, one of the pivot pins 55' may also be employed to connect the lower end of the supporting link 35 to the rectangular frame section 19.

The tractor T illustrated in the drawings is provided at its rearward end with a hydraulic control system which includes a pair of mechanically connected, hinged lifting arms L which are actuated by a hydraulic ram R controlled by the hydraulic system. The lifting arms L are counter-balanced by coil springs S which connect each of the arms L with a bracket on the tractor chassis forward of the arms L. In order to provide for power lifting the plow structure, each end of the cross bar 49 is provided with a reinforced bearing plate 57 which is adapted to be supported upon one of the ram actuated lifting arms L of the tractor hydraulic system. In this connection, the connecting arms 51 should be proportioned so that the plates 57 engage the lifting arms L for the entire lifting cycle of the hydraulic system. When the hydraulic ram system is actuated to raise the lifting arms L, the ends of these arms act upon the bearing plates 57 and raise the rearward end of the bail-like section, the forward rectangular shaped section remaining in the position determined by the control lever and quadrant 41. In the event that the plow structure of the invention is used with a tractor which has lifting arms located in another position, it will be understood that the lifting arms will be connected to the bail-like section 47 by a suitable linkage.

A rearwardly extending shaft or interconnecting member 59 (Fig. 3) is attached to, and extends rearwardly from, a depending bracket 61 on the center portion of the cross member 49. The member 59 is adapted to inter-engage the sub-frame 13 which carries the plow bottoms P and coulters C with the bail-like section 47, as will hereinafter appear.

The plow carrying section or sub-frame 13 is also of fabricated constructoin and includes a pair of mechanically interconnected, spaced apart plow beams 63. A plow bottom P is attached to the rearward end of each of the plow beams 63, and a disc type coulter C is supported from the plow beams 63 adjacent each plow bottom P in the usual manner. A conventional furrow wheel W is attached to the rearward end of the sub-frame structure to aid in controlling the plows during operation. The forward ends of the plow beams 63 are parallel and are rigidly interconnected in spaced-apart relation by forward and rearward transverse braces 65 and 67 respectively and by suitable diagonal braces 69.

The sub-frame 13 which carries the plow bottoms is releasably connected to the frame 11 in the tractor T by means of the shaft 59 which extends longitudinally of the line of draft of the tractor. In this connection means are provided for connecting one end of the shaft 59 to the frame 11 and means for connecting the other end of the shaft 59 to the sub-frame 13. One of the means connecting the shaft 59 to the frame or sub-frame 13 is releasable in response to over a predetermined amount of force so that the frame and sub-frame will be disengaged from one another in the event that over a predetermined draft force is required to move the plow bottoms through the soil. In the illustrated structure the frame 11 is attached to the sub-frame 13 by means which include a tubular member 71 which engages the rearwardly extending interconnecting member or shaft 59 on the crossbar 49 of the bail-like frame section 47. The tubular member 71 extends intermediate the forward and rearward transverse braces, 65 and 67, of the sub-frame 13 and is rigidly connected to each of these braces. An aperture or opening 73 (Figs. 3 and 4) is provided in each of the transverse braces to permit the rearwardly extending member or shaft 59 to fit within the hollow portion of the tube 71.

The forward end of the tube 71 is in effect continued forwardly of the forward cross brace 65 by a flared guide 75 of generally semi-circular cross section. The guide 75, as illustrated in Fig. 3, is adapted to guide the shaft 59 into the tubular member 71. The guide 75 is proportioned to fit around the depending bracket 61 in the crossbar 49 so that the crossbar 49 and the brace 65 may be brought into abutting relation.

As before pointed out, means are provided for releasably locking the frame 11 and the sub-frame 13 together. In this connection the rearward transverse brace 67 includes a pair of rigid, downwardly extending ears 77, one of which is disposed on each side of the opening 73 in the rearward transverse brace 67; the ears 77 support locking means employed to interconnect the frame 11 and the sub-frame 13. The locking means comprises a pair of generally vertically extending clamping arms 79, one of which is pivotally attached to each of the ears 77 by a suitable pivot, as for example the bolt 81 illustrated in Fig. 4. A pair of off-set, guiding brackets 83 for the clamping arms 79 are attached to the transverse brace 67; the brackets 83 being proportioned to guide the clamping arms 79 as they swing about the bolts 81. The edge of each of the clamping arms 79, which are adjacent the opening 73, is shaped to provide a rounded detent portion 85. The rearward end of the shaft 59 on the bail-like section 47 of the tractor supported frame 11 is provided with a tapered end section 87 which is adapted to facilitate insertion of the shaft 59 into the tubular member 71. The shaft 59 is also provided with a peripheral groove 89 of generally semi-circular cross section, about its rearward end, the groove 89 being proportioned to engage the detent portions 85 of the clamping arms 79 (Fig. 5).

In order to maintain the clamping arms 79 in engagement with the shaft 59 to prevent the frame 11 from pulling away from the sub-frame 13 during normal operation, means are provided for resiliently biasing the arms 79 together. The biasing means, in the illustrated structure, includes a hollow, tubular member 91 supported on the upper end of each of the clamping arms 79, the tubular members 91 being axially aligned to form a guideway. A bolt or the like, 93, of suitable length, is inserted through the aligned openings in the tubular members 91, and a compression spring 95 is provided to act intermediate a washer 97 which abuts the end of one of the tubular members and a pair of stop nuts 99 on the end of the bolt 93. The engaging force between the arms 79 and the groove 89 can be varied by changing the position of the nuts 99 on the bolt 93. A suitable spacing block 101 is attached to one of the clamping arms 79 to maintain the arms in a position which will permit the tapered portion 87 of the shaft 59 to pass between the arms.

As pointed out above, the sub-frame 13 is attached to the bail-like section 47 of the frame 11 by means of the shaft 59 which in effect constitutes a longitudinally extending pivot. When the section 47 and the sub-frame 13 are interconnected, the transverse brace 65 abuts the crossbar 49 and these elements are free to rotate relative to one another. Rotation of the sub-frame 13 relative to the bail-like section 47 permits adjustment of the angular relation of the plow bottoms P to the vertical, transversely of the line of draft of the implement. In order that the plows will be held at the desired position during operation, an adjusting means 103 (Figs. 1, 2, and 3) is provided intermediate the crossbar 49 and the cross brace 65, this means being operable to hold the plows in the desired position.

The adjusting means 103 in the embodiment of the invention illustrated, includes a generally vertically extending shaft 105 which is provided with a threaded portion at its lower end and having its upper end shaped to form a crank 107. The lower threaded portion of the shaft 105 is adapted to be screwed into and out of a threaded bracket 109 on the forward end of the sub-frame 13. The shaft 105, intermediate the threaded portion and the crank portion 107, is provided with a pair of spaced apart disks 111 which are rigidly attached to the shaft 105. The adjusting means 103 also includes a forked bracket 113 which is adapted to be attached to the crossbar 49 of the bail-like section 47, the bracket 113 is spaced from the shaft 59 and is positioned to register with the shaft portion of the crank 107 when the plow sub-frame 13 is attached to the bail-like section 47 on the tractor. The forked portions of the bracket 113 are proportioned to fit between the spaced apart disks 111 on the shaft 105, and adjustment of the vertical positions of the plow bottoms P may be accomplished by rotating the shaft 105 by the crank 107, thereby changing the position of the disks 111 relative to the sub-frame 13.

Prior to beginning plowing, the rectangular frame section 19 and the bail-like frame section 47 are attached to the tractor, as described in the foregoing. The tractor T, carrying the frame, is then backed towards the sub-frame 13 which carries the plow bottoms and coulters. By turning the tractor and by controlling the height of the bail-like section 47 with the manual control lever 39 and with the hydraulic lifting arms L, the rearwardly extending connecting shaft 59 enters the tubular member 71. The tractor T is then backed-up until the peripheral groove 89 at the rearward end of the shaft 59 is engaged by the spring biased clamping arms 79. When backing the tractor to engage the frame 11 with the sub-frame 13, care should be taken that the disks 111 on the shaft 105 engage the bifurcated bracket 113 on the crossbar of the bail-like frame section 47. The hydraulic lifting mechanism on the tractor may then be actuated and the plow bottoms lifted from the ground into the transport position.

During operation in the field, the operator lowers the plow bottoms P into the soil by actuating the hydraulic lifting arms L, and the depth of the furrow made by the plow bottoms and the angularity of the plow bottoms relative to the vertical are adjusted by the hand lever 39 and the adjusting means 103, respectively. In the event that over a predetermined draft force is required to move the plow bottoms through the soil, as for example when the plow bottoms strike an obstruction, the pull of the tractor upon the shaft 59 will cause the semi-circular groove 89 to force apart the clamping portions of the arms 85 a sufficient amount to permit the shaft 59 to pull out of the tubular member 71 and away from the sub-frame 13. The disengagement of the main or draft frame 11 from the sub-frame 13, in the event that the draft requirements become too great, insures that the plow structure will not be damaged and that undue strains on the tractor mechanism will be avoided during operation. The construction of the adjusting means 103 is such that the sub-frame 13 is permitted to pull away from the frame 11 without damaging the adjusting means.

In the event that the sub-frame 13 is disengaged from the frame 11 incident to the plow bottoms striking an obstruction in the field, the operator may back the tractor and control the height of the bail-like section 47 of the frame 11 in such a manner that the shaft 59 enters the tubular member 71 to re-engage the sections. After the sections are re-engaged, the operator may continue to back the tractor and at the same time raise the lifting arms to free the plow bottoms from the obstruction.

As pointed out in the foregoing, a plow supporting structure in accordance with the invention permits a large overall reduction in the weight of the supporting frame without the risk of damaging the plow frame due to strains incident to operation. Further, the plow structure of the invention insures that neither the tractor nor the plows will be damaged when the plow bottoms strike an obstruction in the field. In addition to the improved plow support made possible by the invention, provision is also made for adjusting the angular position of the plow bottoms relative to the vertical, transversely of the line of draft of the tractor. This transverse, angular adjustment makes possible the improved operation of the plow, with a consequent reduction in the draft force required to draw the plows through the soil.

A tractor mounted plow in accordance with the invention also offers a great advantage to a farmer who must mount and dismount a plow at frequent intervals to permit the use of the tractor for purposes other than plowing. The plow carrying section may be readily detached from the tractor at any time, and the frame structure which remains on the tractor does not interfere in any way with the use of the tractor for other purposes.

While the plow structure of the invention is of particular utility in connection with tractor supported plows, certain of the features of the invention are applicable to plows in general. Accordingly, various features of the invention which are believed to be new are set forth in the appended claims.

I claim:

1. In a tractor supported plow, a frame which is adapted to be attached to the tractor associated with said plow, said frame being vertically adjustable relative to the ground, a sub-frame, at least one plow bottom attached to said sub-frame, a pivot which extends longitudinally of the line of draft of the associated tractor, means for connecting one end of said pivot to said frame and means for connecting the other end of said pivot to said sub-frame, to interlock said frame and said sub-frame for vertical movement, one of said connecting means being releasable, said releasable connecting means associated with said pivot being operable to disengage said sub-frame from said tractor supported frame in the event that over a predetermined draft force is required to move the plow bottoms through the soil.

2. In a tractor supported plow, a frame which is adapted to be attached to the tractor associated with said plow, said frame being vertically adjustable relative to the ground, a sub-frame, at least one plow bottom attached to said sub-frame, and a pivot which extends longitudinally of the line of draft of the associated tractor, means for connecting one end of said pivot to said frame and means for connecting the other end of said pivot to said sub-frame to interlock said frame and said sub-frame for vertical movement one of said connecting means being releasable, said releasable connecting means associated with said pivot being operable to disengage said sub-frame from said tractor supported frame in the event that over a predetermined draft force is required to move the plow bottoms through the soil, and releasable means disposed intermediate said sub-frame and said frame at a point spaced from said pivot for adjusting the angularity of said sub-frame relative to said frame about the axis defined by said pivot.

3. In a tractor supported plow, a frame which is adapted to be attached to the tractor associated with said plow, said frame including a bail-like section having a rearwardly extending pivot rigidly attached thereto, means for adjusting the height of said bail-like section relative to the ground, a sub-frame, at least one plow bottom attached to said sub-frame, means for attaching said sub-frame to said pivot to interlock said frame and said sub-frame for vertical movement, said last mentioned means including means operable to disengage said sub-frame from said pivot in the event that over a predetermined draft force is required to move the plow bottoms through th soil, and adjustable means disposed intermediate said sub-frame and said bail-like section of said frame at a point spaced from said pivot for determining the relative angular position of said sub-frame relative to said frame whereby the angular position of said plow bottoms is adjustable relative to the vertical, transversely of the line of draft of the tractor about the axis of said pivot, said adjustable means being releasable.

4. In a tractor supported plow, a frame which is adapted to be attached to the tractor associated with said plow, said frame including a bail-like section having a rearwardly extending pivot rigidly attached thereto, power operated means for adjusting the height of said bail-like section relative to the ground, said pivot having a peripheral groove formed therein, a sub-frame, at least one plow bottom attached to said sub-frame, and means for releasably attaching said sub-frame to said pivot including resiliently biased clamping members which are adapted to engage the peripheral groove in said pivot, over a predetermined draft force upon said pivot being operable to overcome the biasing force upon said clamping members and to thereby disengage said sub-frame from said main frame.

5. In a tractor supported plow, a frame which is adapted to be attached to the tractor associated with said plow, said frame including a section attached to said tractor, a bail-like section which has a crossbar and a pair of forwardly extending arms, means for attaching the forward end of each of said arms to the section of said frame attached to said tractor, power operated means for raising and lowering the rearward end of said bail-like section, a rearwardly extending shaft rigidly attached to said crossbar, the rearward end of said shaft having a peripheral groove formed therein, a sub-frame, at least one plow bottom attached to said sub-frame, means on said sub-frame for rotatably engaging said shaft, means on said sub-frame for releasably engaging said shaft including at least one clamping arm movable to engage the peripheral groove in said shaft, and a spring for biasing said clamping arm into the engaged position, over a predetermined draft force on said shaft being operable to overcome the force of the spring biasing on said clamping arm and to thereby disengage said sub-frame from said bail-like section.

6. In a tractor supported plow, a frame which is adapted to be attached to the tractor to be associated with said plow, said frame including a section attached to said tractor, a bail-like section having a crossbar and a pair of forwardly extending arms, means for attaching the forward end of each of said arms to the section of said frame attached to said tractor, power operated means for raising and lowering the rearward end of said bail-like section, a rearwardly extending shaft rigidly attached to said crossbar, the rearward end of said shaft having a peripheral groove formed therein, a sub-frame, at least one plow bottom attached to said sub-frame, means on said sub-frame for releasably engaging said shaft including a pair of clamping arms which are adapted to engage the peripheral groove in said shaft, and a spring for biasing said clamping arms together, over a predetermined draft force on said shaft being operable to overcome the force of the spring biasing said clamping arms and to thereby disengage said sub-frame from said bail-like section, and adjustable means acting between said sub-frame and said crossbar, at a point spaced from said shaft, for turning said sub-frame about said shaft whereby the angular position of said plow bottoms is adjustable relative to the vertical, transversely of the line of draft of the tractor.

7. In a plow which is adapted to be supported upon a tractor which has a pair of rearwardly extending power operated lift arms, a frame which is adapted to be attached to the tractor, said frame including a section attached to said tractor the rearward end of which is rearwardly positionable relative to said tractor, and a bail-like section which includes a crossbar and a pair of forwardly extending arms, the forward ends of said arms being pivotally attached to the rearward end of the section attached to said tractor, means on said crossbar for engaging said power operated lifting arms on the tractor, a rearwardly extending shaft rigidly attached to the center of said crossbar, the rearward end of said shaft having a peripheral groove formed therein, a sub-frame, at least one plow bottom attached to said sub-frame, means on said sub-frame for releasably engaging said shaft including a tubular member for receiving said shaft and a pair of clamping arms which are adapted to engage the peripheral groove in said shaft, and a spring for biasing said clamping arms in said groove, over a predetermined draft force on said shaft being operable to overcome the force of the spring biasing said clamping arms and to thereby disengage said sub-frame from said bail-like frame section, and adjustable means acting between said sub-frame and said crossbar at a point spaced from said shaft for turning said sub-frame about said shaft, said adjustable means including a bifurcated member on said crossbar and a cooperating adjustably positionable member on said sub-frame which is adapted to register with said bifurcated member, whereby the angular position of said plow bottoms relative to the vertical is determined by the position of said adjustably positionable member.

8. In a tractor-mounted plow, the combination of a tractor, a plow, a pivotal connection between the tractor and the plow releasable upon attainment of a predetermined load, and a guiding connection spaced laterally from the pivotal connection and adjustable up and down to effect leveling of the plow, and said guiding connection being constituted to separate upon relative longitudinal movement between the tractor and the plow in one direction.

JOHN M. MARKEL.

REFERENCES CITED

The following references are of record in the file of this patent:

UNITED STATES PATENTS

| Number | Name | Date |
|---|---|---|
| 1,298,989 | Mason | Apr. 1, 1919 |
| 1,765,788 | Daniel | June 24, 1930 |
| 2,065,015 | Nielsen | Dec. 22, 1936 |
| 2,420,530 | Evans | May 13, 1947 |
| 2,430,696 | Acton | Nov. 11, 1947 |